Jan. 3, 1928.

S. E. CLYNE

STAND FOR MOTORCYCLES

Filed Dec. 2, 1925

1,654,862

INVENTOR.

SIDNEY E. CLYNE
BY
A. B. Bowman
ATTORNEY

Patented Jan. 3, 1928.

1,654,862

UNITED STATES PATENT OFFICE.

SIDNEY E. CLYNE, OF CHULA VISTA, CALIFORNIA.

STAND FOR MOTOR CYCLES.

Application filed December 2, 1925. Serial No. 72,732.

My invention relates to stands for motorcycles, particularly to a stand for supporting the front end or front portion of a motorcycle in an upright position.

The objects of my invention are: first, to provide a device of this class whereby a motorcycle may be easily and quickly supported in an upright position when stopping the same, and whereby the motorcycle may be still more easily started from its supported position without giving the device the least bit of consideration; second, to provide a device of this class for supporting motorcycles in an upright position which is positioned normally in front of the operator and in close proximity to his feet so that he need simply to shift the device downwardly either when straddling the frame of the motorcycle or when dismounting; third, to provide a device of this class which is automatically shifted to an out-of-the-way position when the motorcycle is shifted forwardly, either manually or by power from its motor; fourth, to provide a stand for motorcycles of relatively great width, but which will not interfere in any way with the operator or the perfect functioning of the motorcycle by reason of its great width, for rigidly supporting the motorcycle in an upright position; fifth, to provide a device of this class which is so positioned on the motorcycle frame that a substantially rigid three-point support is provided for the motorcycle when at rest; sixth, to provide a stand for motorcycles in the form of a U-shaped member mounted at the forward portion of the frame behind the front wheel thereof, and which is adapted to be supported in an out-of-the-way position at its supporting portions underneath the foot boards or rests of the motorcycle; seventh, to provide a stand of this class for motorcycles which is automatically shifted in an out-of-the-way position by a spring means when the stand is disengaged from the ground; eighth, to provide as a whole a novelly constructed device of this class, and ninth, to provide a device of this class which is very simple and economical of construction, durable, efficient, practical, and which will not readily deteriorate or get out of order.

Figure 1:
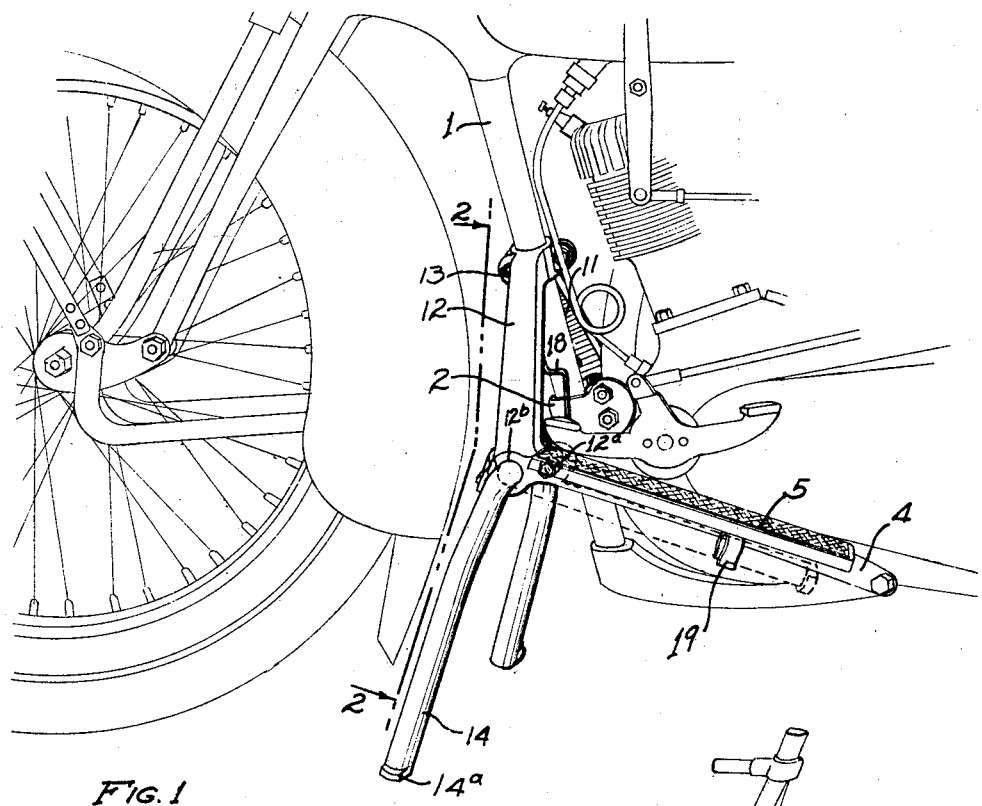
Figure 2:
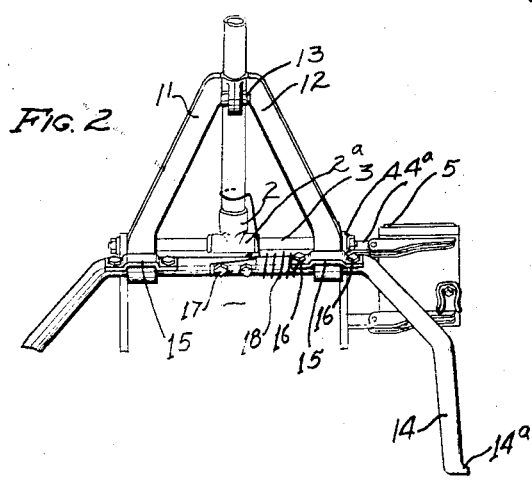
Figure 3:
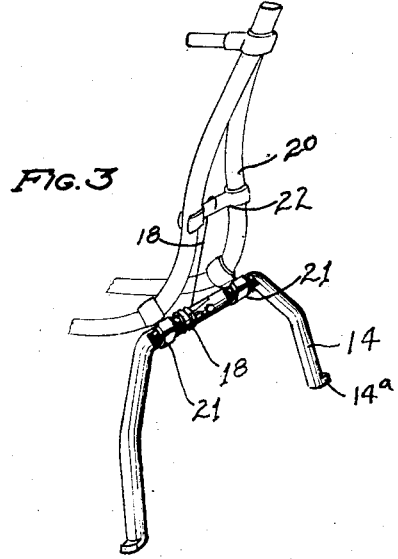

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary perspective view of the front portion of a conventional motorcycle, taken from the side thereof, with my stand mounted thereon; Fig. 2 is a fragmentary front elevational view thereof on a slightly reduced scale, taken at 2—2 of Fig. 1, and Fig. 3 is a fragmentary perspective view of the frame of another type of motorcycle, with my stand mounted thereon.

Like characters of reference refer to similar parts and portions throughout the several views of the drawings.

The fragmentary portions of the motorcycle, shown in Figs. 1 and 2 of the drawings, are those of a commonly known "Harley Davidson" motorcycle. The frame of this motorcycle is provided with a single strut, designated 1 in the drawings, which extends downwardly from the upper portion of the frame behind the front wheel. Intermediate the upper and lower ends of the strut 1 is secured a fitting 2, which is provided at its forward portion with a horizontal, transversely extending rod positioning sleeve 2ª. Through this sleeve extends a foot-rest supporting rod 3, which is secured intermediate its ends in said sleeve, as shown in Fig. 2. At the ends of this rod are secured the forward ends of the foot-rest support 4, which are provided intermediate their ends with outwardly extending foot-rest supporting portions or lugs 4ª upon which are pivotally mounted the foot-rests 5.

To adapt my motorcycle stand for this type of motorcycle, I have provided a pair of diagonal brackets 11 and 12, which are provided at their upper ends with recesses adapted to receive the strut 1 intermediate its upper end and the portion provided with the fitting 2. The upper ends of these brackets are clamped to the struts by means of bolts 13. These brackets extend outwardly and downwardly from the portions secured to the strut 1 and are provided at their outer lower ends with enlarged portions in which are provided horizontal holes designated by 12ª in Fig. 1, which holes are adapted to receive the foot-rest supporting rod 3 for supporting the lower ends of the brackets, which are positioned with their lower ends against the forward ends of the supports 4. Positioned forwardly from the holes designated by 12ª, in the enlarged portions of the brackets, are provided other holes designated by 12ᵇ in Fig. 1. In the latter holes is pivotally mounted the cross portion of the U-shaped supporting stand member 14. This member 14 is retained laterally relatively to the pivot portions of the brackets 11 and 12 by means of U-shaped clips 15, which are secured to the member 14 by means of bolts or screws 16. Said clips 15 perform the double function of laterally positioning the stand member 14 as well as limiting the forward positions of the leg portions of the stand member when the same is positioned to support the front portion of the motorcycle, as shown in Fig. 1. The stand member 14 is preferably made in two parts and lapped at the middle portion, which lapped portion is secured together by means of bolts 17. Making the stand member 14 in two parts, as stated, facilitates the assembling of the same on the brackets without dismounting the same, or dismounting of any portions of the frame when the stand is used on other types of motorcycles.

Around the cross portion of the U-shaped stand member 14 is positioned a coil spring 18, which is secured at its one end by one of the bolts 16 securing one of the clips 15 to the member 14. The other end of the spring 18 is preferably hooked around the strut 1, as shown in both Figs. 1 and 2. This spring 18 is adapted to shift the supporting legs of the member 14 backwardly when the weight of the motorcycle is taken therefrom when running the motorcycle. The backwardly shifted position of the stand member 14 is shown by dotted lines in Fig. 1.

Underneath one or both of the foot-rests 5, intermediate the ends thereof, is provided a resilient, U-shaped retaining member 19 which is adapted to yieldably hold one of the leg portions of the member 14 in an out-of-the-way position underneath the foot-rests. It will be here noted that the spring action of the spring 18 is sufficient to shift the member 14 backwardly and yieldably hold the same against the under side of the foot-rests, except when the motorcycle travels over rough roads, in which case the retaining clip 19 performs its function.

The lower or outer ends of the leg portions of the stand member 14 are provided with outwardly extending lugs 14ª, which provide a greater foot-rest for the leg portions when resting on the ground as well as provide means for shifting the stand member 14 downwardly to its operative position, it being noted that the lugs 14ª preferably extend beyond the lateral sides of the foot-rests so as to be readily engaged by the toe of the operator when the motorcycle is brought to a stop.

It will be readily seen from the above that when it is desired to support the motorcycle on the ground in an upright position after the same is stopped, the stand member is shifted downwardly to the ground and the motorcycle pulled backwardly until the clips 15 engage the upright portions of the brackets 11 and 12, thus providing a rigid three-point support for the motorcycle not obtainable by other stands now in use. When it is desired to start off with the motorcycle, the same is shifted forwardly either manually or by the power of the engine imparted to the rear wheel. The shifting of the motorcycle forwardly, so that the pivoted portion of the stand member is shifted forwardly beyond the vertical line passing through the foot portions of the leg members, permits the stand member to be automatically shifted backwardly by the spring 18.

The portion of the motorcycle frame, shown in Fig. 3, is that of a commonly known "Henderson" motorcycle. In this structure a double strut 20 is provided at the front portion behind the front wheel. At the lower portion of this strut is provided a pair of fittings having alining holes normally adapted for receiving a rod or securing a side car to the motorcycle when one is used. In this type of motorcycle, no auxiliary supporting brackets are necessary for supporting my stand member. The one end of the spring 18 in the latter construction is preferably hooked around a horizontal brace 22 extending between the separate members of the double strut 20.

Though I have shown and described a particular construction, combination and arrangement of parts and portions of my motorcycle stand and particular adaptations thereof, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a device of the class described, the combination with a motorcycle, of a U-shaped supporting stand member pivotally mounted at its one end on the frame of the motorcycle behind the front wheel thereof, a spring means at the pivotal portion of said stand member and in connection with said frame for forcing said stand member backwardly clear of the ground about its pivotal mounting against the under sides of the foot-rests of the motorcycle, and a yieldable clip member secured to the under side of one of the foot-rests for yieldably retaining said stand member in an upwardly shifted, out-of-the-way position.

2. In a device of the class described, the combination with a motorcycle, of a U-shaped supporting stand member pivotally mounted at its one end on the frame of the motorcycle behind the front wheel thereof, a spring means at the pivotal portion of said stand member and in connection with said frame for forcing said stand member backwardly clear of the ground about its pivotal mounting against the under sides of the foot-rests of the motorcycle, and a yieldable clip member secured to the under side of one of the foot-rests for yieldably retaining said stand member in an upwardly shifted, out-of-the-way position, the normally lower foot ends of said stand member being provided with laterally extended portions adapted to extend beyond the outer edges of the foot-rests of the motorcycle when said stand member is in an out-of-the-way position, whereby the downward shifting of said stand member is facilitated.

3. In a device of the class described, the combination with a motorcycle, of a U-shaped supporting stand member pivotally mounted at its cross portion on the frame of the motorcycle behind the front wheel thereof, and combined positioning and stop means in connection with said stand member for laterally positioning the same relatively to the frame of the motorcycle and for limiting the forwardly shifted supporting position thereof.

4. In a device of the class described, the combination with a motorcycle, of a rigid U-shaped supporting stand member pivotally mounted at its cross portion on the frame of the motorcycle behind the front wheel thereof, and a spring member surrounding the cross portion of said stand member and secured at its one end thereto and at its opposite end to a portion of the frame of the motorcycle for normally forcing said stand member about its pivotal mounting clear of the ground.

5. In a device of the described, the combination with a motorcycle, of a U-shaped supporting stand member pivotally mounted at its cross portion on the frame of the motorcycle behind the front wheel thereof, a spring member surrounding the cross portion of said stand member and secured at its one end thereto and at its opposite end to a portion of the frame of the motorcycle, for normally forcing said stand member about its pivotal mounting clear of the ground, and a U-shaped resilient retaining member supported by the frame of the motorcycle for receiving and yieldably retaining one of the leg portions of said stand member when the same is shifted upwardly clear of the ground.

6. In a device of the class described, the combination with a motorcycle, of a U-shaped supporting stand member pivotally mounted at its one end on the frame of the motorcycle behind the front wheel thereof, a spring means at the pivotal portion of said stand member and in connection with said frame for forcing said stand member backwardly clear of the ground about its pivotal mounting against the under side of the foot-rest portions of the motorcycle, and means at the foot ends of the leg portions of the stand member adapted to extend outwardly laterally beyond the outer edges of the foot-rest portions of the motorcycle whereby the downward shifting of said stand member is facilitated.

7. In a device of the class described, the combination with a motorcycle, of a bracket means secured at its upper end to an upright strut of the frame of the motorcycle and at its lower end to a horizontal member of said frame, the lower ends of said means being provided with horizontal pivotal portions, and a U-shaped supporting stand pivotally mounted at its cross portion in the pivotal portions of said bracket means.

8. In a device of the class described, the combination with a motorcycle, of a bracket means secured at its upper end to an upright strut of the frame of the motorcycle and at its lower end to a horizontal member of said frame, the lower ends of said means being provided with horizontal pivotal portions, a U-shaped supporting stand pivotally mounted at its cross portion in the pivotal portions of said bracket means, and a spring member surrounding the cross portion of said stand and secured at its one end thereto and at its opposite end to said strut.

In testimony whereof, I have hereunto set my hand at San Diego, California, this 18th day of November, 1925.

SIDNEY E. CLYNE.